US008800623B2

(12) United States Patent
Gardetto et al.

(10) Patent No.: US 8,800,623 B2
(45) Date of Patent: Aug. 12, 2014

(54) MULTI-PIECE RUN-FLAT INSERT

(76) Inventors: William W. Gardetto, Coleyville, TX (US); Michael D. Marquart, Lake Wylie, SC (US)

( * ) Notice: Subject to any disclaimer, the term of this patent is extended or adjusted under 35 U.S.C. 154(b) by 311 days.

(21) Appl. No.: 13/167,158

(22) Filed: Jun. 23, 2011

(65) Prior Publication Data

US 2011/0315287 A1 Dec. 29, 2011

Related U.S. Application Data

(60) Provisional application No. 61/477,139, filed on Apr. 19, 2011, provisional application No. 61/357,835, filed on Jun. 23, 2010.

(51) Int. Cl.
*B60C 17/00* (2006.01)
*B60C 17/04* (2006.01)

(52) U.S. Cl.
USPC ............................ 152/516; 152/152; 152/520

(58) Field of Classification Search
USPC ........................................................ 152/152
See application file for complete search history.

(56) References Cited

U.S. PATENT DOCUMENTS 3,397,728 A 8/1968 McCrary et al.
2006/0260727 A1 11/2006 Chen et al.

FOREIGN PATENT DOCUMENTS

| EP | 226967 | * | 7/1987 |
| EP | 0430743 A1 | | 6/1991 |
| JP | 6-183225 | * | 7/1994 |
| JP | 2005-28888 | * | 2/2005 |
| JP | 2006-315643 | * | 11/2006 |
| SU | 779102 | * | 11/1980 |
| WO | WO 2008104730 A1 | | 9/2008 |
| WO | WO 2010011340 A2 | | 1/2010 |
| WO | WO 2011/010536 | * | 1/2011 |

OTHER PUBLICATIONS

International Preliminary Report on Patentability for PCT/US2011/041683, mailed Jan. 10, 2013, published as WO 2011/163513.
International Search Report, PCT/US2011/041683, mailed Sep. 6, 2011.
Written Opinion, PCT/US2011/041683, mailed Sep. 6, 2011.

* cited by examiner

*Primary Examiner* — Justin Fischer
(74) *Attorney, Agent, or Firm* — Choate Hall & Stewart LLP; William R. Haulbrook

(57) ABSTRACT

The present application relates generally to a tire support system including a plurality of support sectors. The plurality of support sectors when connected forms an annular support ring.

21 Claims, 12 Drawing Sheets

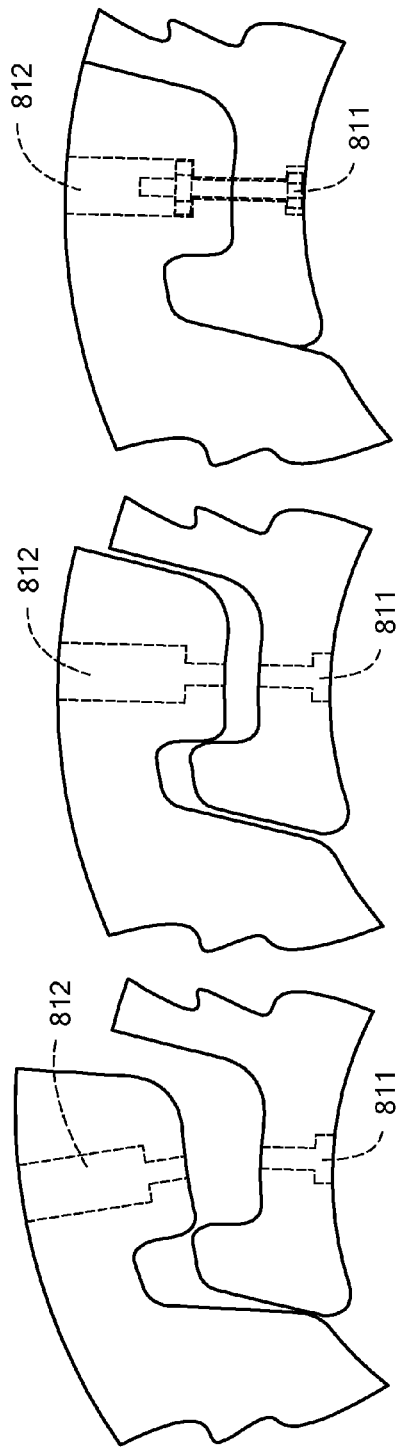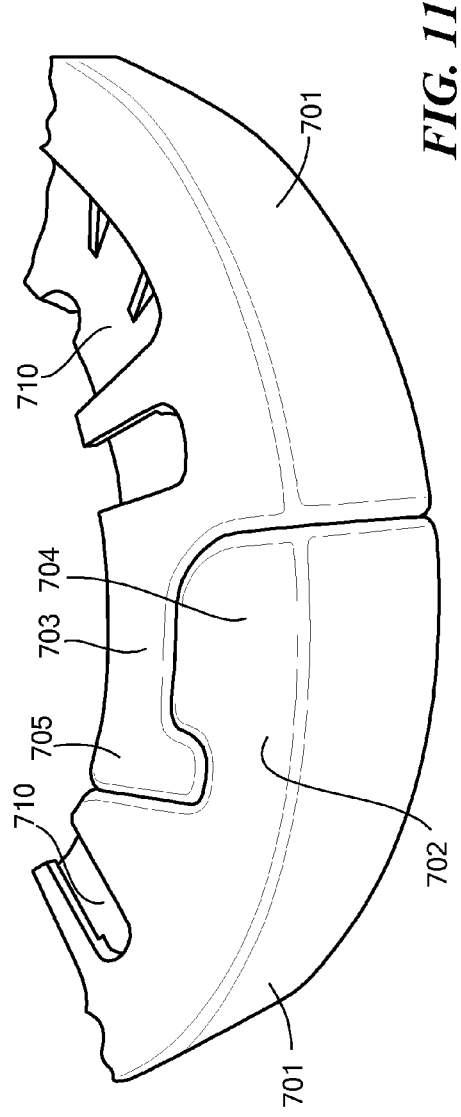

MULTI-PIECE RUN-FLAT INSERT

CROSS REFERENCE TO RELATED APPLICATIONS

The present application claims priority to U.S. provisional patent application Nos. 61/357,835, filed Jun. 23, 2010 and 61/477,139, filed Apr. 19, 2011, both of which are hereby incorporated by reference herein in their entireties.

TECHNICAL FIELD

The present application relates generally to a supporting insert employed to accommodate a vehicle traveling on a flat or deflated tire.

BACKGROUND

Vehicles traveling on pneumatic tires are susceptible to impeded mobility through sustained tire damage that substantially reduces the air pressure between the tire and a wheel that the tire is mounted on. To limit such susceptibility a vehicle may be equipped with a system that allows the vehicle to maintain a safe level of mobility after the occurrence of such damage. Systems that maintain a vehicle's drive mobility when a tire is damaged are known as "run-flat" systems.

Some run-flat systems provide a distinct support system mountable on the wheel between the wheel and the tire. Such systems bear the vehicle's load during a tire deflated condition. The loads on the support include substantial loads in radial and lateral directions, which loads stress the support material and structure in tensile, compressive, and shear modes. These loads challenge the integrity and operation of such a system and make it increasingly challenging to provide a system which may be easily installed, yet handles the rigors of safely maintaining a vehicle's ability to continue traveling on a damaged tire, particularly in a range of environments that include off-road environments.

SUMMARY

In some aspects a tire support system includes a plurality of support sectors. Each support sector may have a first end including an overlap extension extending therefrom and a second end including an overlap extension extending therefrom. Each overlap extension may include a terminal flange and a terminal flange engagement region, which engagement region includes a surface contoured to conform to at least one terminal flange on at least one other support sector in the plurality of support sectors. Each of the first and second ends of each sector may also include at least one of a projection and a recess projecting from or into one of the sector and the overlap extension. The sectors are configured to form an annular ring when the respective overlap extensions of adjacent sectors are overlapped and the adjacent sectors thereby connected. Each support sector in the plurality of support sectors may be arcuate. Each sector in the plurality of sectors may be connected to an adjacent sector via engagement of a projection on one end of one sector with a recess on one end of another. Each overlap extension may be at least one of an outer and an inner overlap extension, and the plurality of sectors may include an equal number of outer and inner overlap extensions. One or more projections may project from the terminal flange of the overlap extension. The projection and recess may be tapered such that they increase in lateral width radially outwardly. Each support sector may include at least one recess in each lateral face of the sector. Each support sector may include at least two bead blocks engaged with each support sector, the bead blocks positioned in the recess in the lateral faces of the sectors. Each support sector may include at least one hole in each overlap extension and may also include a fastener extending through each pair of overlapping extensions in a radial direction. The fastener may be a nut and bolt. The fastener may be positioned in a counter sunken through-hole in the inner overlap extension. The terminal flange on the overlap extension extending from the first end of each sector may be distinct from the terminal flange on the overlap extension extending from the second end of each sector. The terminal flange on the overlap extension extending from the first end of each sector may be identical with the terminal flange on the overlap extension extending from the second end of each sector. Each support sector may include one projection extending and one recess projecting respectively from and into one of the sector and the overlap extension. Each support sector may include at least one projection and at least one recess having a profile selected from the group consisting of: a triangular profile, a squared profile, a rectangular, a pentagonal profile, and a semi-circular profile. Each sector in the plurality of sectors may be identical in some implementations while each sector in the plurality of sectors may be distinct in other implementations. Each sector in the plurality of sectors may engage the adjacent sector in a combined radial and lateral engagement.

In some aspects a tire support system includes a plurality of arcuate support sectors. Each support sector may have a first end and a second end, each of which includes an overlap extension extending therefrom. Each overlap extension may include a terminal flange and a terminal flange engagement region, the engagement region having a surface contoured to conform to the terminal flange on another support sector. Each sector of the plurality of sectors may be connected to an adjacent sector via engagement of the terminal flange on one end of one sector with the terminal flange engagement region on one end of another sector, whereby the respective overlap extensions of adjacent sectors overlap and the plurality of connected sectors form an annular support.

In some aspects a tire support system includes a plurality of support sectors, wherein each support sector includes a first end including an overlap extension extending therefrom and a second end including an overlap extension extending therefrom. Each overlap extension on each of the first and second ends of each sector may further include at least one of a tapered projection and a tapered recess projecting from or into one of the sector and the overlap extension. Each sector of the plurality of sectors may be connected to an adjacent sector via engagement of a projection on one end of one sector with a recess on one end of another sector, whereby the respective overlap extensions of adjacent sectors overlap and the plurality of connected sectors form an annular support.

In some aspects a method includes connecting a plurality of arcuate support sectors into an annular support within a pneumatic tire, each support sector having a first end including an overlap extension extending therefrom and a second end including an overlap extension extending therefrom. Each overlap extension may include a terminal flange and a terminal flange engagement region. The terminal flange engagement region includes a surface contoured to correspond with at least one terminal flange on at least one other support sector in the plurality of support sectors. Each of the first and second ends of each sector may further include at least one of a projection and a recess projecting from or into one of the sector and the overlap extension. Each sector of the plurality of sectors may be connected to an adjacent sector via engagement of a projection on one end of one sector with a recess on one end of another sector, whereby the respective overlap extensions of adjacent sectors overlap one another. The method may also include inserting a first portion of a split wheel having a first outer flange within the annular support and may further include connecting a second outer flange to the wheel, such that the tire and the annular support are concentrically positioned on the split wheel.

In some aspects a tire support system includes a plurality of arcuate support sectors, each support sector having a first end including an overlap extension extending therefrom and a second end including an overlap extension extending therefrom. At least one overlap extension of each sector may include a terminal flange, and at least one overlap extension of each sector may include a terminal flange engagement region. The terminal flange engagement region has a surface contoured to conform to the terminal flange on another support sector. Each sector of the plurality of sectors may be connected to an adjacent sector via engagement of the terminal flange on one end of one sector with the terminal flange engagement region on one end of another sector, whereby the respective overlap extensions of adjacent sectors overlap and the plurality of connected sectors form an annular support ring. Each of the first and second ends of each sector may further include at least one of a projection and a recess projecting from or into one of the sector and the overlap extension. Each sector of the plurality of sectors may be connected to an adjacent sector via engagement of a projection on one end of one sector with a recess on one end of another sector.

In some aspects an apparatus includes a plurality of arcuate support sectors that includes a first support sector and a second support sector. The first support sector includes a first end and a second end. The first end may include a first overlap extension extending therefrom, the first overlap extension including a first terminal flange and a first terminal flange engagement region. The second end may include a second overlap extension extending therefrom, the second overlap extension including a second terminal flange and a second terminal flange engagement region. The first terminal flange engagement region may have a first surface contoured to correspond with at least one terminal flange on a second support sector. The second terminal flange engagement region may have a second surface contoured to correspond with at least another terminal flange on the second support sector. The first end may further include a projection projecting from the first overlap extension of the first end. The second end may include a recess receding into the second overlap extension of the second end. The first end of the first support sector may be configured to be connected to at least the second support sector via engagement of the projection with a recess on an end of the second support sector, and the second end of the first support sector may be configured to be connected to at least the second support sector via engagement of the recess with a projection on another end of the second support sector such that the first support sector and the at least two support sectors form at least part of an annular support ring. The sectors of the apparatus may further be configured such that, when the first support sector is connected with at least two support sectors of the plurality of support sectors, the first overlap extension of the first support sector overlaps with a respective overlap extension of another support sector of the at least two support sectors, and the second overlap extension of the first support sector overlaps with a respective overlap extension of a separate support sector of the at least two support sectors.

BRIEF DESCRIPTION OF THE DRAWINGS

Certain features of a provided closure system are described in detail herein below with reference to the figures, wherein:

FIGS. 8-10 show engagement of overlap extensions of adjacent support sectors;

FIG. 11 illustrates engaged support sectors;

DETAILED DESCRIPTION

Figure 1:
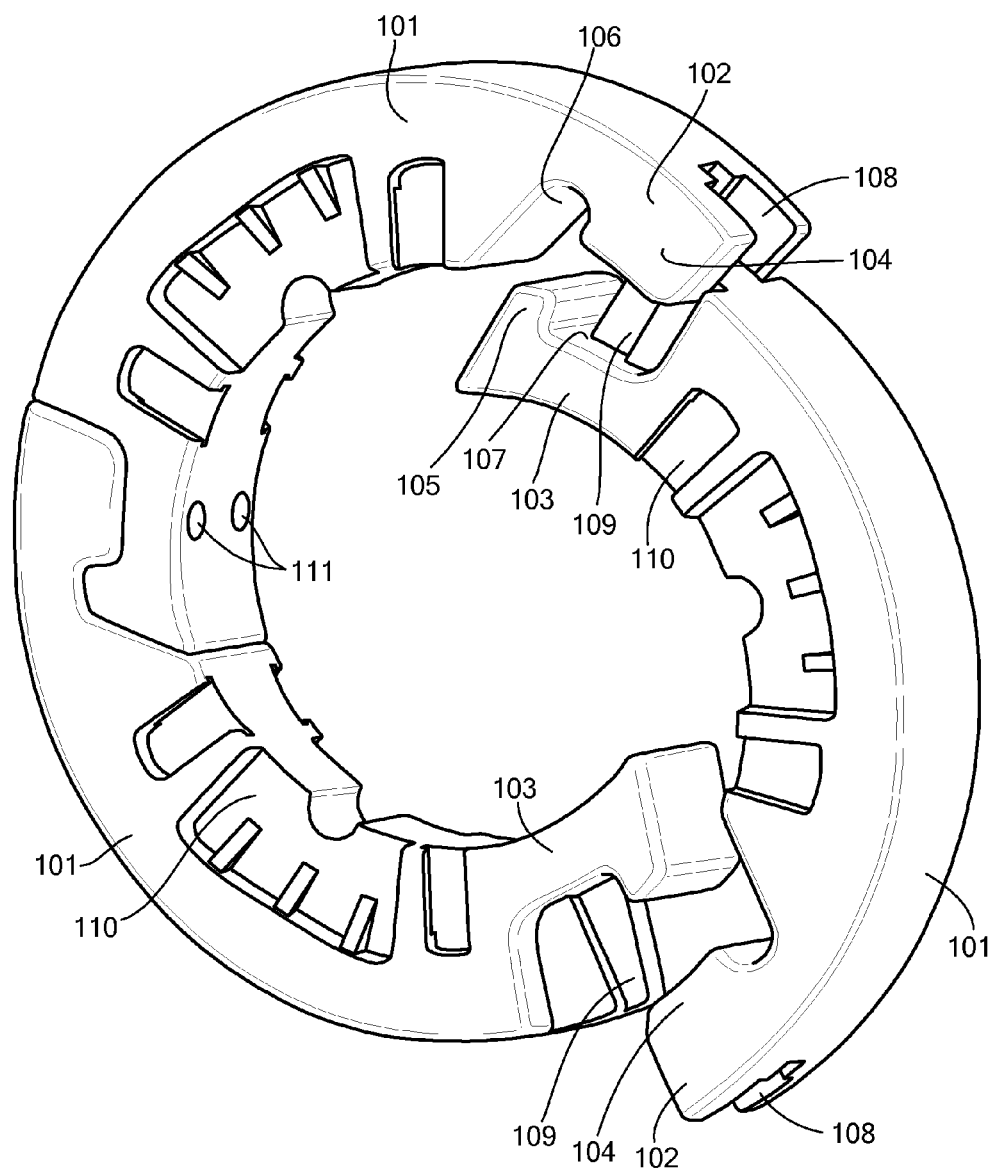
FIG. 1 is a perspective view of a tire support.

As used herein the following terms shall have the meanings indicated, unless indicated otherwise:

Referring now to the drawing figures, wherein like references numerals identify similar, identical, or corresponding elements, tire support systems and methods of using and producing the same are described.

FIGS. 1-4 depict a multi-piece tire support system. FIG. 1 is a perspective view of such a multi-piece support system. As shown in FIG. 1, support system 100 includes a plurality of arcuate support sectors 101. Arcuate support sectors generally include support sectors having at least some degree of curvature, which curvature may be constant. In the demonstrated implementation, the support system is composed of 3 arcuate support sectors. However, in accordance with various implementations, the support system may include two or more sectors forming the support ring. Each of the support sectors 101 includes an overlap extension 102 extending from a first end of sector 101 and an overlap extension 103 extending from a second end of sector 101. An "overlap extension" in some implementations may include an extension of a support sector that has a size and shape that may allow it to be brought into an overlapping orientation with another extension to create a union between the overlapping extensions that may be substantially uniform with the respective sectors from which the overlapping extensions extend. In the depicted implementation, overlap extension 102 is an outer overlap extension as it is positioned on the periphery of the annular support system 100 formed by the connected sectors 101 forming a supporting ring. Overlap extension 103 is an inner overlap extension in the implementation depicted in FIG. 1 since overlap extension 103 is positioned along the inner diameter of the annular support system 100 formed by the connected support sectors 101. Extensions 102 and 103 on adjacent sectors overlap one another when these sectors are connected. Each sector may have identical overlap extensions extending from each end or they may be distinct from one another as extensions 102 and 103 are in the depicted implementation shown in FIG. 1.

In FIG. 1, each of the overlap extensions 102 and 103 include a terminal flange 104 and 105 respectively. A "terminal flange" in some implementations may be a flange located at a terminus of a member from which the flange projects. Flanges 104 and 105 may be dimensionally distinct from one another in some implementations, while they may be identical in other implementations. Each of the overlap extensions 102 and 103 also include a terminal flange engagement region 106 and 107 respectively. As demonstrated in FIG. 1, the terminal flange engagement region 106 has a surface that is contoured to correspond to the terminal flange 105 on the adjacent arcuate sector. In some implementations, the terminal flanges 106 and 105 provide an increased engagement surface between adjacent sectors, which may contribute to improved support of transferred loading and may reduce material stress in the shear form and also may reduce strain on the material.

Each overlap extension section may include at least one of a projection and a recess. FIG. 1 illustrates a recess 108 projecting into extension 102 and a projection 109 projecting out of extension 103. In some implementations, the projection and recess have shapes corresponding with one another so that the projection can engage the recess in a mating engagement. In accordance with various implementations, a single sector may include a projection projecting from each extension section, a recess projecting into each extension section, or a projection projecting from one extension and a recess extending from the other extension. However, in some implementations, the plurality of sectors forming an annular support sector includes an equal number of projections and recesses and the overlap extensions on adjacent sectors includes one projection and one recess so that the adjacent sectors may engage as shown in FIG. 1. In some implementations, the projection may provide greater radial support for dynamic force transfer to adjacent sectors and may improve the ability of the sectors to accommodate lateral loading during run-flat conditions. Engaging projection 109 with recess 108 may also reduce deflection of one sector with respect to the other as one sector may be compressed during rolling while the other sectors remain uncompressed. The difference in the radial compression forces exhibited by adjacent sectors may tend to move one sector with respect to the other, in a manner that may be referred to as stepping deflection. The engagement of projection 109 with recess 108 may reduce any stepping deflection and thus, may provide smoother operation of the support system. In other implementations, "non-" or "near-" identical sectors may be used.

In the implementations depicted in FIG. 1, each sector includes an overlap extension with a recess and an overlap extension with a projection as each of the sectors 101 is identical. In some implementations, having identical sections may contribute to ease of installation and may reduce manufacturing costs as a single consistent molding may be provided.

FIG. 1 also demonstrates other aspects of various implementations, such as the recesses 110 positioned along the lateral faces of sectors 101. As detailed further herein, recess such as recesses 110, allow engagement of bead block components, which components, in some implementations, help maintain the position of the annular support with respect to the wheel that the annular support is mounted on and assist in maintaining contact between the bead flange of a tire and a flange of the wheel. Other features such as holes 111, which extend completely through the inner overlap extensions 103 and at least partially into the outer overlap extensions 102 in the demonstrated implementation, allow components such as fasteners to be inserted to assist in maintaining the engagement of interlocked sectors. As detailed further herein, such holes may include a countersunken feature so that a fastener including a head that is wider than the fastener body may be inserted completely into each respective sector 101 without protruding and thereby allowing each sector 101 of ring 100 to smoothly abut the wheel to which the sector is mounted.

Figure 2:
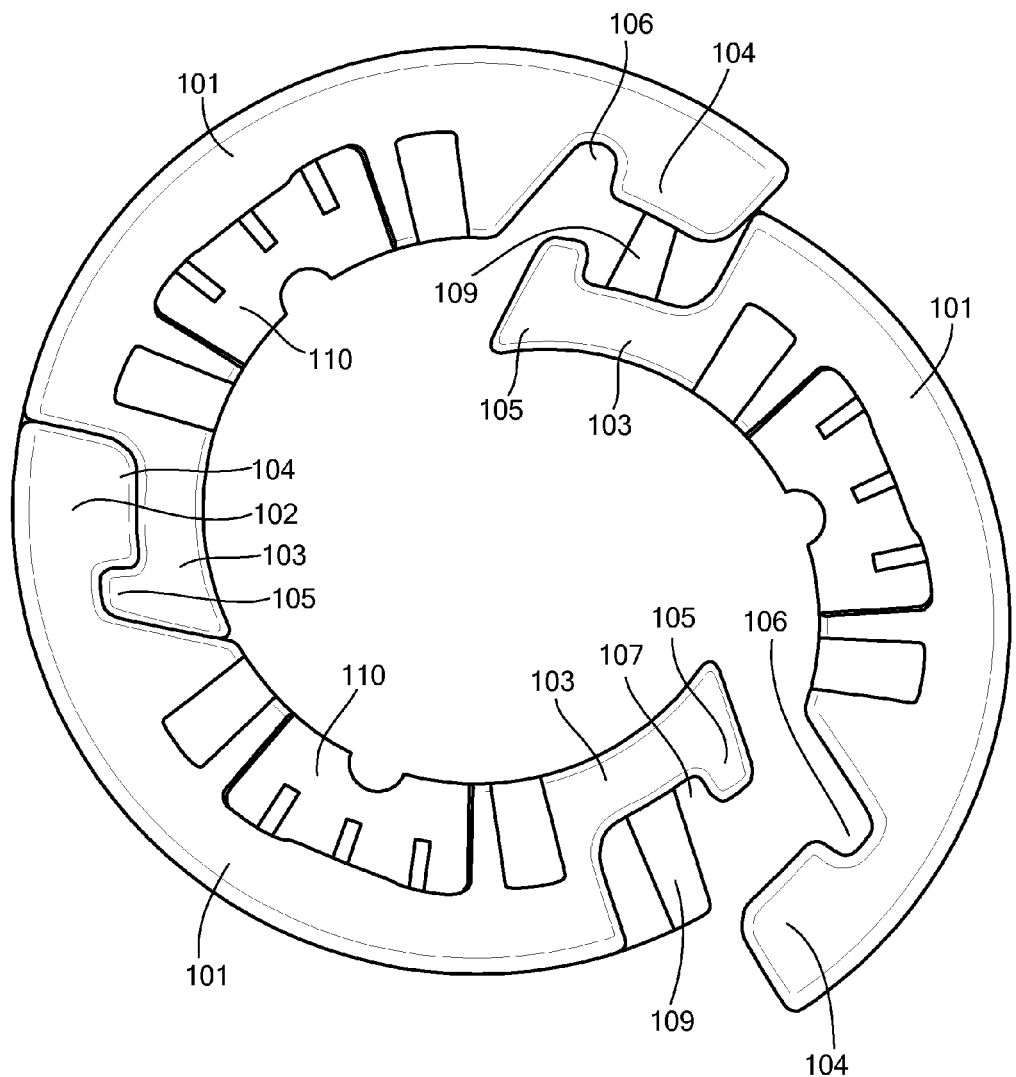
FIG. 2 is a side view of the tire support system of FIG. 1.

FIG. 2 is a side view of the tire support system of FIG. 1. As can be seen in FIG. 2, the projection 109 extending from extension 103 and sector 101 is insertable into a recess in extension 104 (recess 108 shown in FIG. 1), by sliding the sector in a radial direction with respect to the adjoining sector 101. This motion also assists in the engagement of flange 105 with flange engagement region 106, as discussed further herein in reference to FIGS. 8-10. Once the sectors are completely engaged, the annular support 100 has a substantially smooth outer surface and inner surface. FIG. 2 further demonstrates that the terminal flanges 104 and 105 may be angled with respect to a line or plane extending radially with respect to annular support 100.

Figure 3:
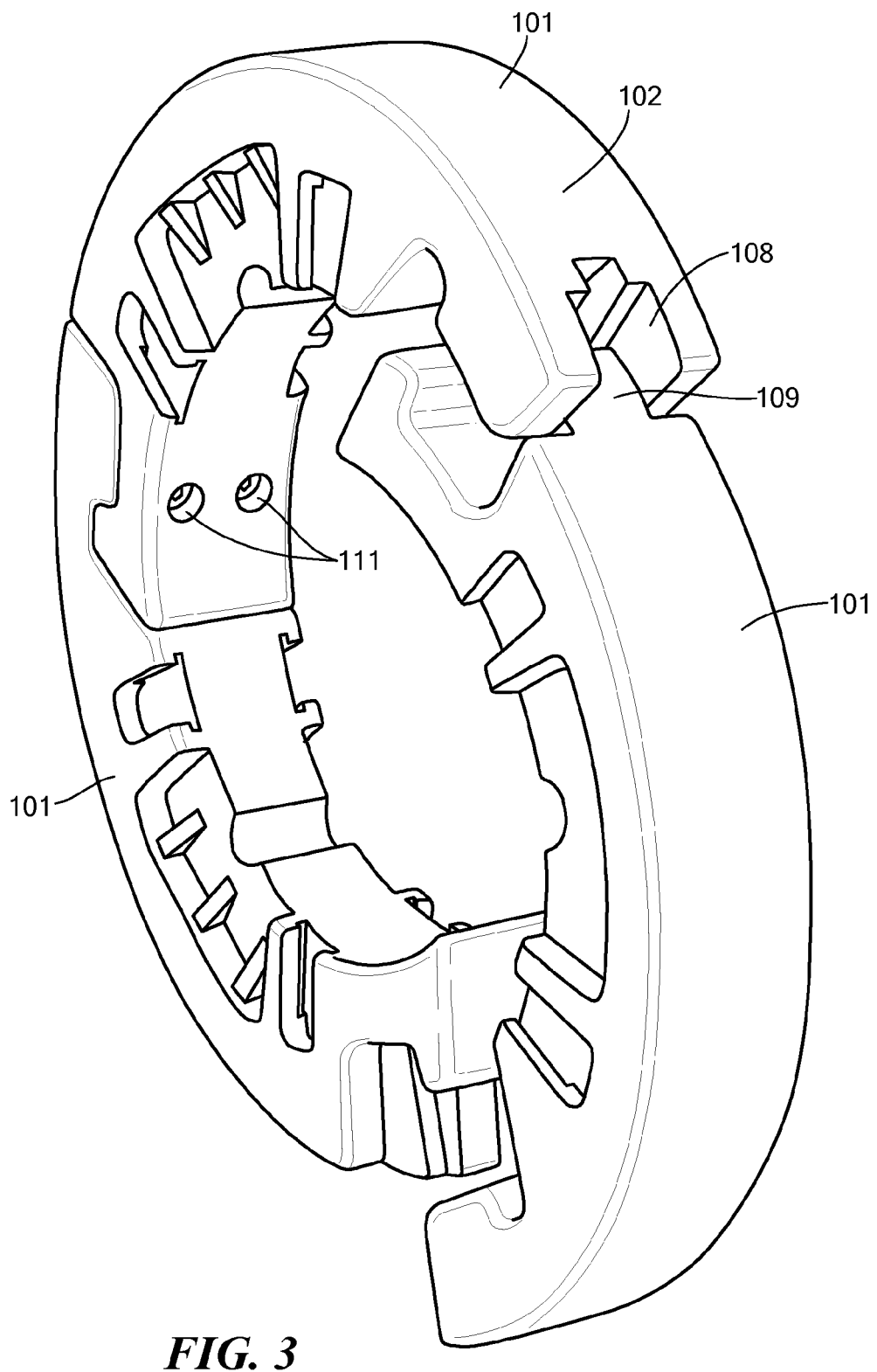
FIG. 3 is another perspective view of the tire support system of FIGS. 1 and 2.

FIG. 3 is another perspective view of the tire support system of FIGS. 1 and 2. FIG. 3 provides a good depiction of recess 108 in extension 102. As demonstrated, the recess, which corresponds to the shape of a projection 109, may include a multifaceted profile. Recess 108 and projection 109, may also be tapered. For example, a tapered recess or projection may decrease or increase in width radially. Alternatively or additionally, the projection or recess may decrease in width or increase in width along the curvature of the support sector.

Figure 4:
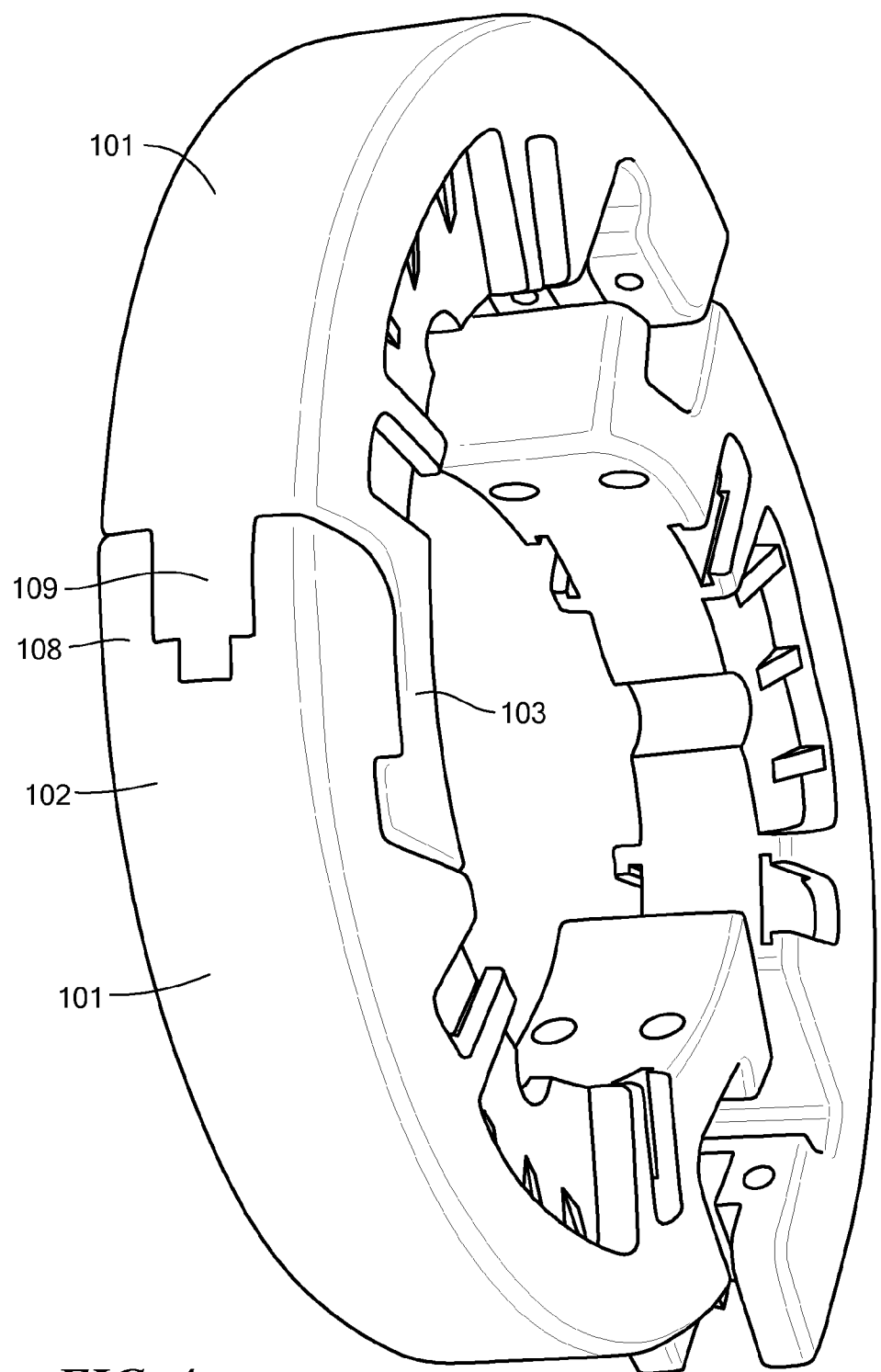
FIG. 4 is another perspective view of the tire support system of FIGS. 1-3.

FIG. 4 is another perspective view of the tire support system of FIGS. 1-3. FIG. 4 depicts a projection 109 completely engaged with a recess 108.

In accordance with various implementations, sectors 101 may be provided in a polyurethane or polymer material. Sectors 101 may also be composed of other flexible materials, or may be composed of a variety of plastics, nylons, or hard vulcanized rubber. The sectors may be formed through a variety of molding techniques including vulcanization molding (room temperature or otherwise) and injection molding.

Figure 5:
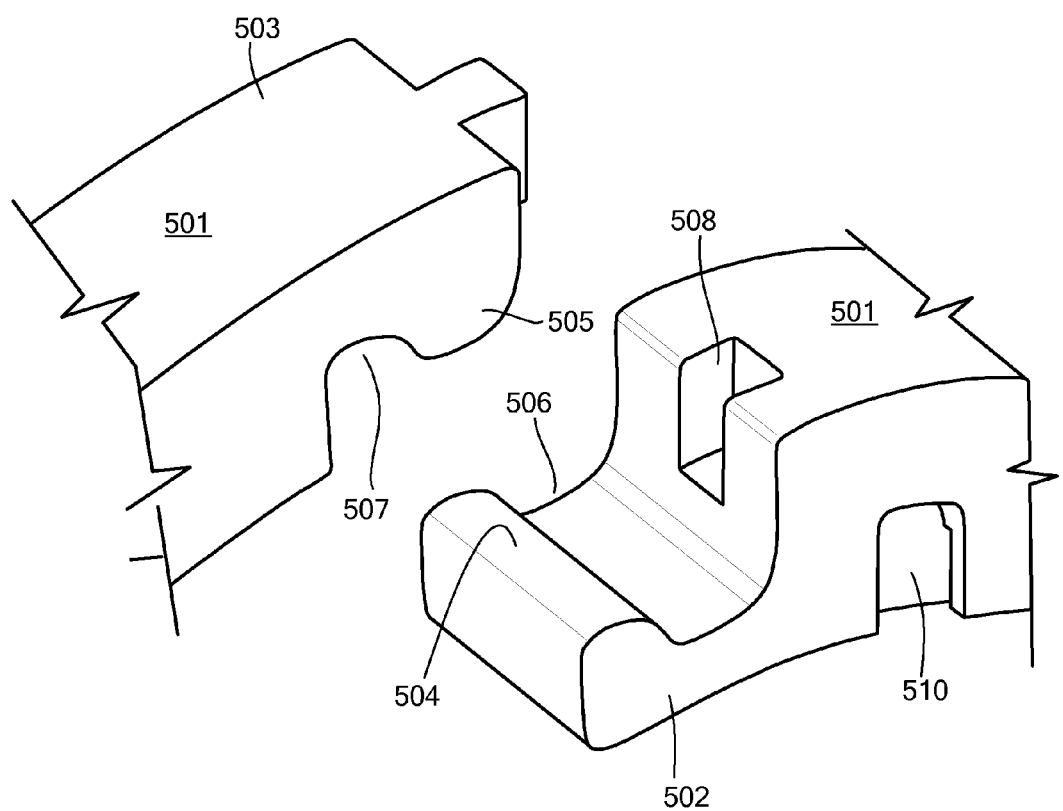
FIG. 5 shows support sectors.

FIG. 5 shows alternative support sector implementations. The support sectors demonstrated in FIG. 5 illustrate implementations where the projection extends from terminal flange 505 on overlap extension 503 of sector 501. FIG. 5 further illustrates recess 508 projecting into sector 501. Each support sector may include a projection and a recess, and as illustrated in FIG. 5, the recess or projection may extend directly into or project directly out of either the overlap extension or the end of the sector from which the overlap extension extends. The projection and or extension extend in a direction corresponding to the curvature of the arcuate support sector. The projection demonstrated in FIG. 5 includes a terminal flange 504 which corresponds to the terminal flange engagement region 507. Terminal flange engagement region 506 corresponds to the shape of terminal flange 505. Sectors 501 include recesses 510 for engaging a bead block.

Figure 6:
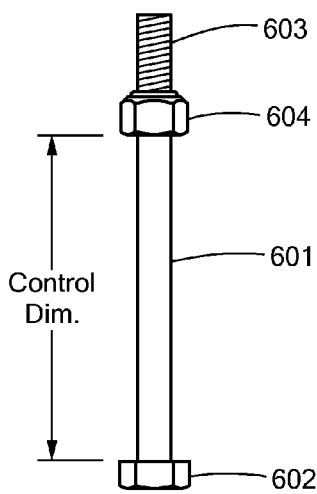
FIG. 6 illustrates a fastener.

FIG. 6 illustrates a fastener useable with various tire support system implementations. The fastener depicted in FIG. 6 is a bolt and nut type fastener. Bolt 601 includes a threaded shaft portion 603 for receiving a nut 604. A portion of the shaft is smooth. The portion of the shaft from head 602 of the bolt to the threaded region 603 dictates the minimal fastening distance. A variety of adjustable fasteners may be used including a clamping fastener or a screw type fastener.

Figure 7:
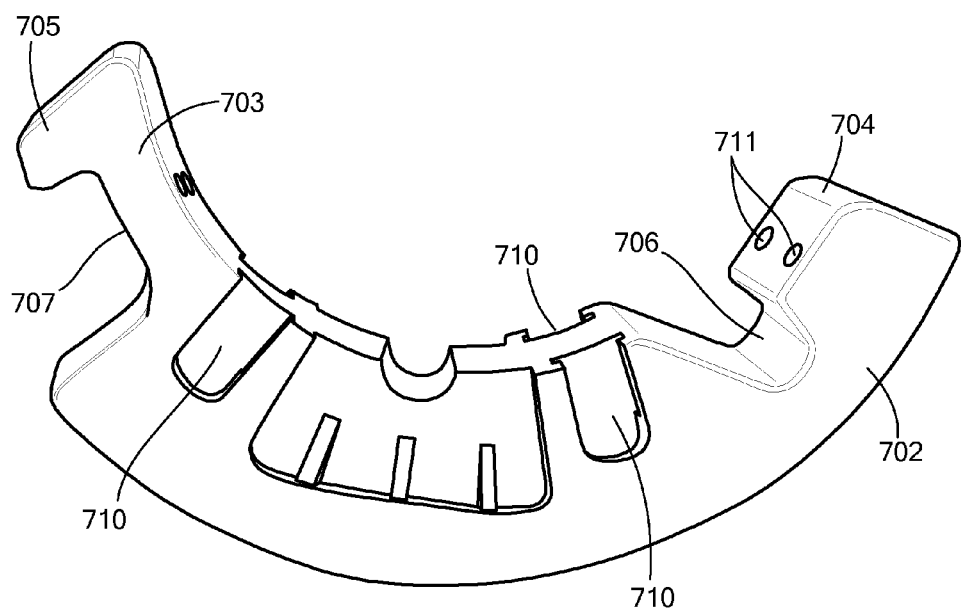
FIG. 7 illustrates a support.

FIG. 7 illustrates a support sector. Support sector 701 has overlap extensions 702 and 703 similar to those provided in the implementations demonstrated in FIGS. 1-5. Overlap extensions 702 and 703 include terminal flanges 704 and 705 as well as terminal flange engagement regions 706 and 707. As illustrated terminal flanges 704 and 705 may be dimensionally distinct from one another. The implementation shown in FIG. 7 also includes recesses 710 in a lateral face of sector 701 for engaging a bead block with the sector. Unlike the implementations demonstrated in FIGS. 1-5, the implementation provided in FIG. 7 does not include a distinct projection and recess projecting into or out of the sector or extension along the radius of curvature of the sector. This implementation further includes holes 711 for engagement with a fastener.

FIGS. 8-10 show engagement of overlap extensions of adjacent support sectors. FIG. 8 demonstrates overlap extensions 702 and 703 when they are initially aligned in overlapping positions with one another. The outer overlap extension 702 is radially further from a center point or vertex of each arcuate sector than inner overlap extension 703. Each of these extensions includes a hole for engagement with a fastener in the demonstrated implementation. The hole 811 in inner overlap extension 703 extends entirely through a portion of the extension and is countersunk on the radially inward side of extension 703. The hole 812 in outer overlap extension 703 extends only partially into the extension. As shown, hole 812 is in the terminal flange of extension 702 in the illustrated implementation and hole 811 is in the terminal flange engagement region. Accordingly as the terminal flange and the terminal flange engagement region are brought into alignment as shown in FIGS. 9 and 10 the holes 811 and 812 begin to align with one another and eventually create a single path or channel for receiving a fastener that helps secure the sectors together.

FIG. 11 provides an alternative prospective view of engaged support sectors. As demonstrated, the connected sectors 701 provide a substantially smooth outer surface upon which the inner side or inner liner of the tire tread may rest in the event of a flat tire condition.

Figure 12:
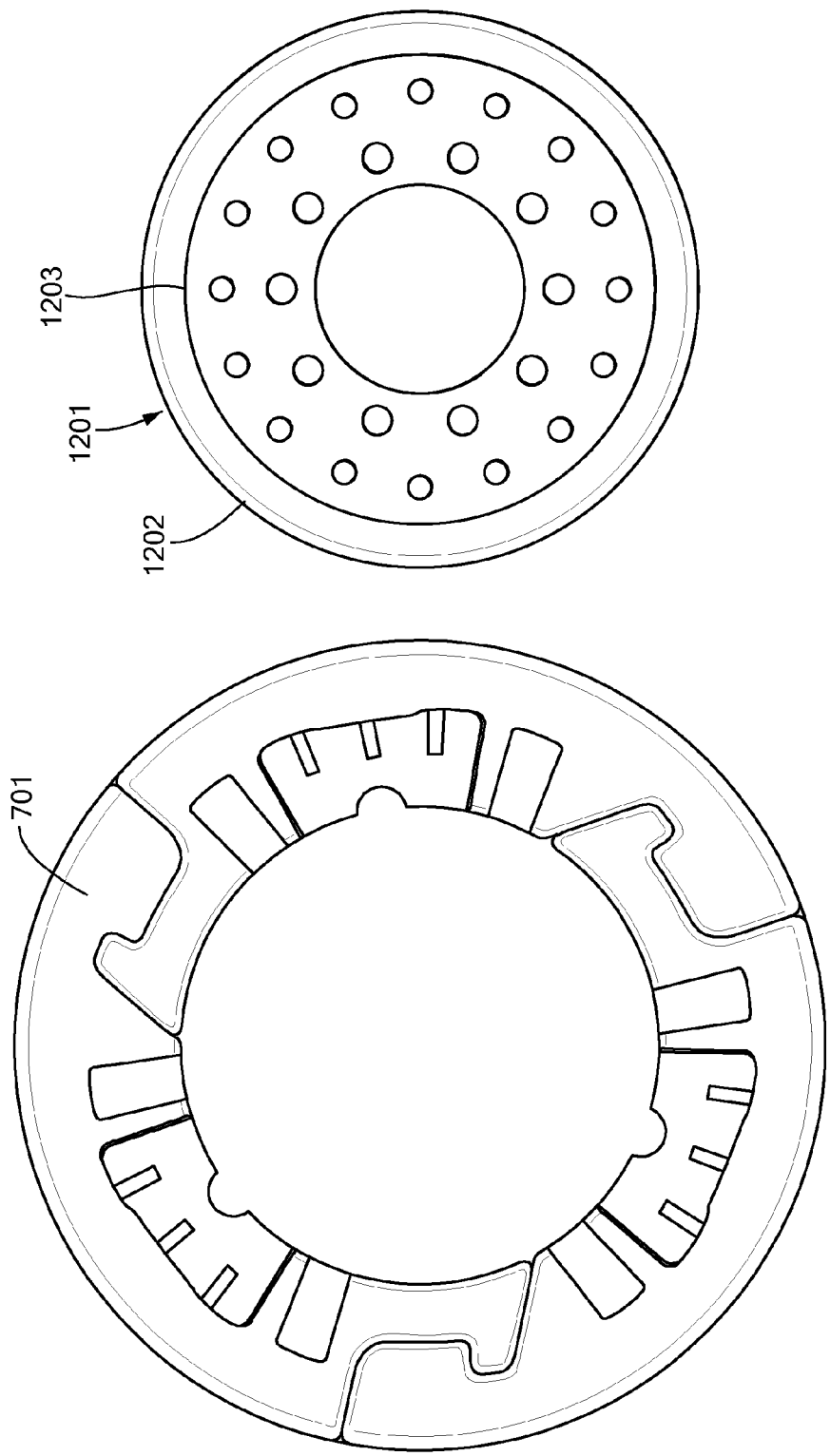
FIG. 12 illustrates an annular support ring formed from engaged support sectors and a wheel upon which the support ring may be mounted.
Figure 13:
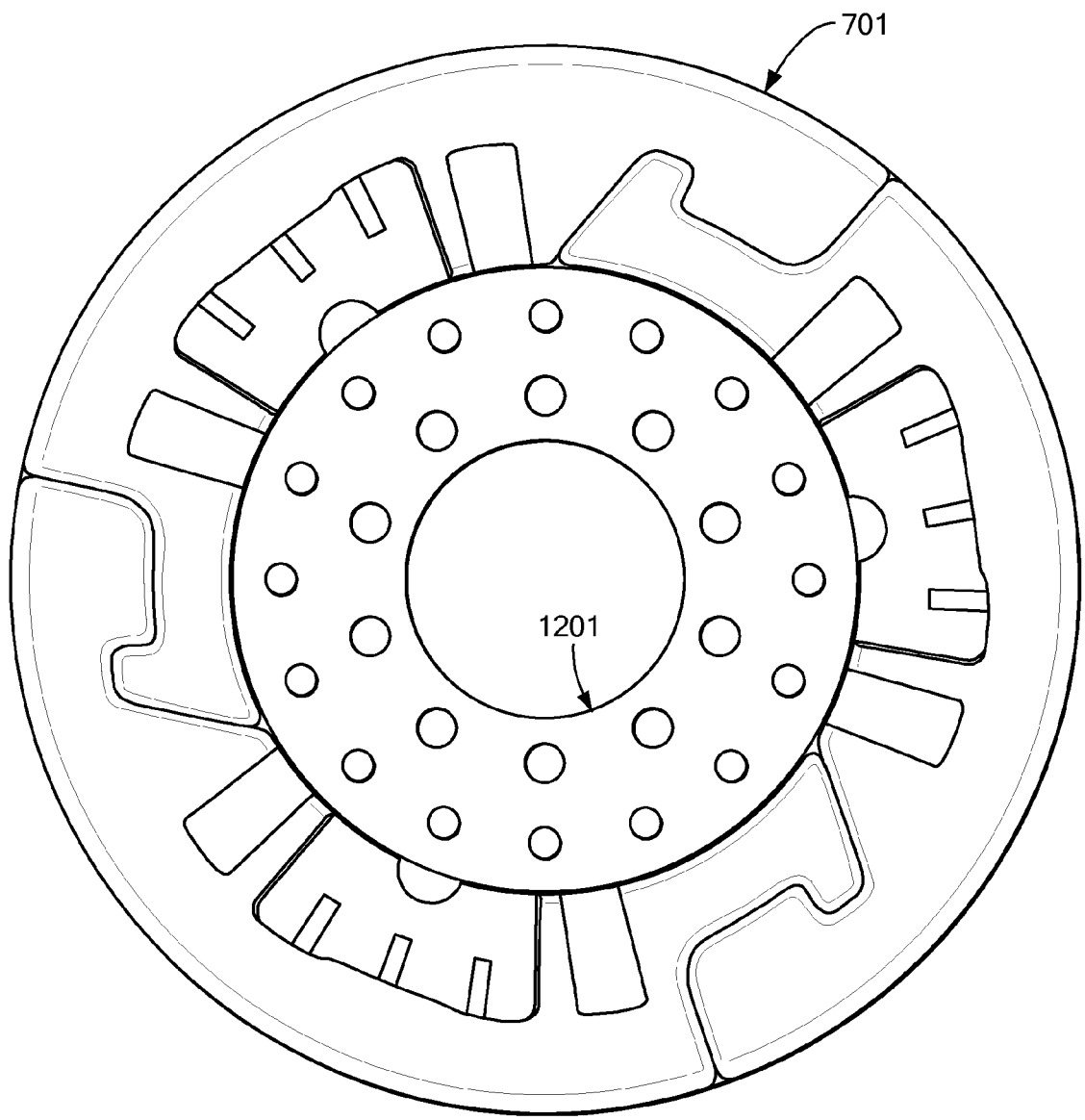
FIG. 13 shows the annular support ring of FIG. 12 mounted on the wheel shown in FIG. 12.

FIG. 12 illustrates an annular support ring formed from engaged support sectors and a wheel upon which such a ring may be mounted. Connection of a plurality of support sectors 701 provides a complete annular ring, which ring may be engaged with a wheel such as wheel 1201. The inner diameter of the support ring formed by the connected sectors 701 substantially corresponds with an outer diameter of surface 1203 of wheel 1201. In some implementations, the wheel also includes a lip or flange 1202 having a larger diameter, in the illustrated implementation, than the inner diameter of the annular support ring formed by connected sectors 701. Flange 1202 is engaged by the bead of a tire mounted on the wheel, the engagement of which may be assisted by auxiliary bead-blocks attached to a tire support according to some implementations. Wheel 1201 is a spit wheel; however, various implementations may be used with other wheel types. FIG. 13 shows the annular support ring of FIG. 12 mounted on the wheel shown in FIG. 12.

Figure 14:
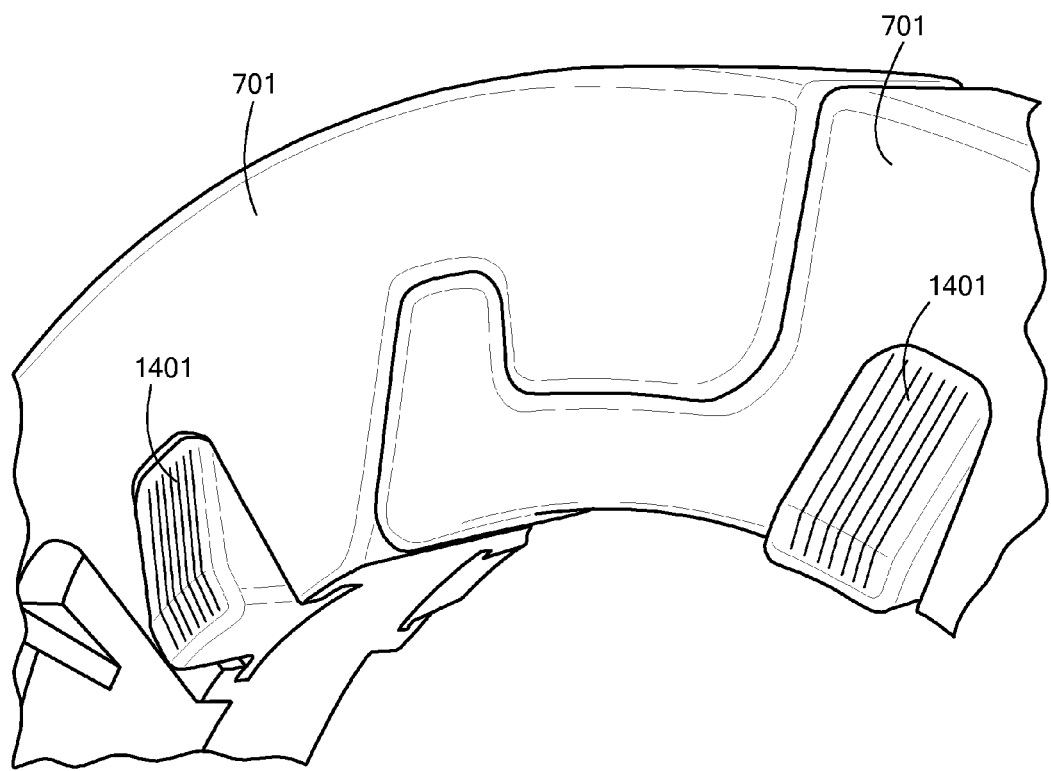
FIG. 14 illustrates engaged sectors of a support ring and a bead block engaged with such sectors, both the sectors and bead block mounted on a wheel.

FIG. 14 illustrates engaged sectors forming a support ring and bead blocks engaged with such sectors, where both the support ring and bead block are mounted on a wheel. The bead block 1401 engages recesses in the lateral face of the arcuate support sectors defining the annular ring, such as support sectors 701 or sectors 101. Such blocks generally are positioned on each lateral face of a sector. The support sector is thereby sandwiched between two bead blocks. The two bead blocks 1401 and the support ring between the bead blocks are accordingly mounted concentrically on wheel 1201. When the tire is mounted on the wheel the bead block presses against the bead of the tire which is pressed against the rim or flange of the wheel. The support ring is thereby pressed on both lateral faces by the bead block, which compression assists in maintaining the position of the support ring with respect to wheel 1201.

Figure 15:
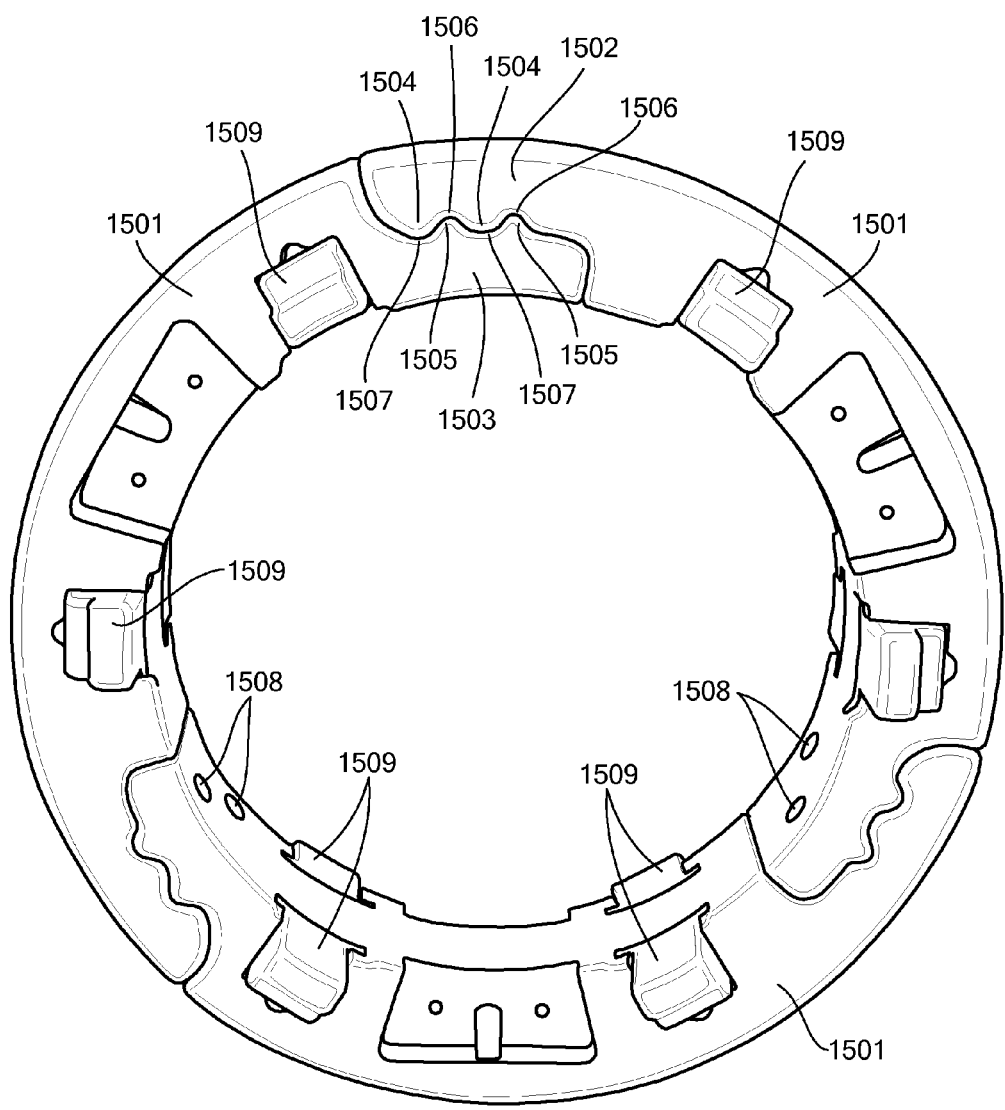
FIG. 15 shows a semi-key implementation of a support system.

FIG. 15 shows a support system composed of sectors having a semi-key profile. The plurality of semi key support sectors 1501 engage to form an annular support system. While the annular support system is illustrated composed of 3 support sectors 1501 in the illustrated implementation, it is not required or limited to 3 support sectors and may be composed of more or less sectors 1501. Each semi-key support sector 1501 may include a plurality of ribs 1504 and 1505 and a plurality of recesses 1506 and 1507 in the overlap extension portions 1502 and 1503 of each sector 1501. The ribs 1504 on extension 1502 generally correspond in shape to the recesses 1507 on extension 1503. Similarly ribs 1505 generally correspond in shape to the recesses 1506 on extension 1502. The ribs 1504 and recesses 1506 may extend laterally across the entire width of the extension 1502 in some implementations while extending laterally across only a portion of the extension in other implementations. Extensions 1502 and 1503 may include terminal flanges in various implementations. The support sectors may also include fasteners 1508 to assist in maintaining the engagement of support sectors 1501 with one another. The support sectors 1501 may also include bead blocks 1509 engaged in the side walls of each sector. The semi-key support sectors are typically used in lower profile applications (i.e. applications where the annular support must have an overall lower height radially) where the engaging profiles assist in reducing the side to side movement and twist of one sector with respect to an adjacent sector. The ribs 1506 and corresponding recesses 1507 may be provided in other geometrical shapes or profiles including, but not limited to, a triangular, saw-tooth, or wedge shape, a square or rectangular profile, a pentagonal profile, half-round, other curved profiles, or any combination of these as exemplarily demonstrated in FIGS. 16 and 17.

Figure 16:
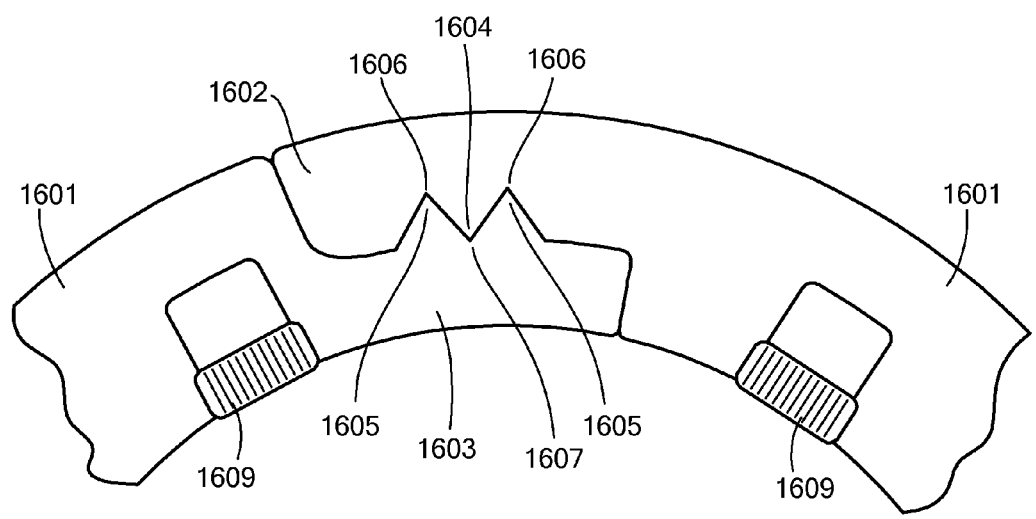
FIGS. 16 and 17 show variations on the semi-key implementation shown in FIG. 15.
Figure 17:
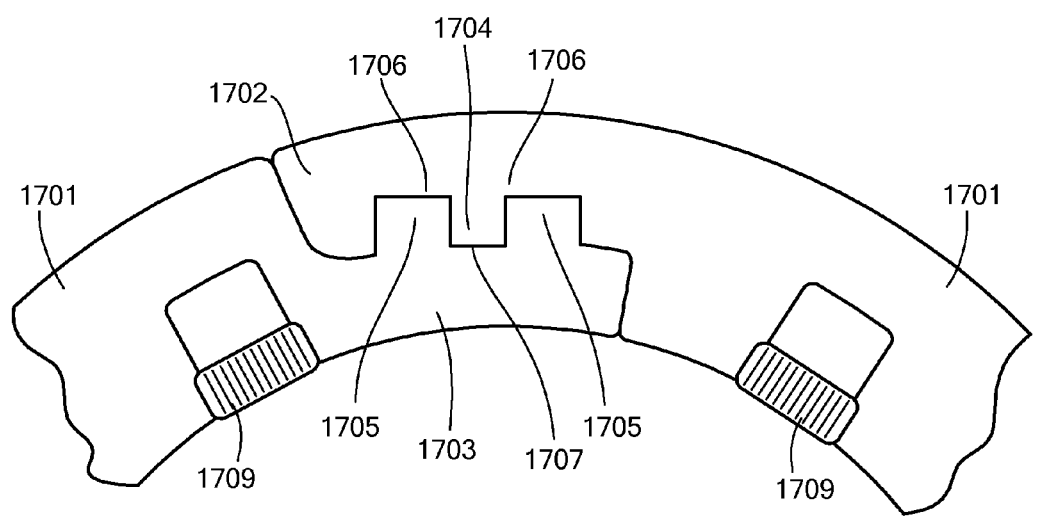

FIGS. 16 and 17 show variations on the semi-key implementation shown in FIG. 15. FIG. 16 demonstrates portion of an annular support composed of a plurality of semi key support sectors 1601 having triangular or saw-tooth profiles on their respective overlap extensions 1602 and 1603. Each sector 1601 may include a plurality of ribs 1604 and 1605 on extensions 1602 and 1603 respectively and may also include a plurality of recesses 1606 and 1607 on extensions 1602 and 1603 respectively. As FIG. 16 further demonstrates support sectors 1601 may include bead blocks 1609.

Similarly, FIG. 17 demonstrates portion of an annular support composed of a plurality of semi key support sectors 1701 having rectangular profiles on their respective overlap extensions 1702 and 1703. Each sector 1701 may include a plurality of ribs 1704 and 1705 on extensions 1702 and 1703 respectively and may also include a plurality of recesses 1706 and 1707 on extensions 1702 and 1703 respectively. As FIG. 17 further demonstrates support sectors 1701 may also include bead blocks 1709.

The above described implementations provide solely exemplary implementations. Those of ordinary skill in the art will appreciate that the present invention includes variations of the disclosed implementations and modifications of the implementations disclosed are within the scope of the present invention and may be captured by any claims provided herein or added hereto.

We claim:

1. A tire support system comprising:
   a plurality of support sectors, each support sector having a first end including an overlap extension extending therefrom and a second end including an overlap extension extending therefrom, each overlap extension including a terminal flange and a terminal flange engagement region, the terminal flange engagement region having a surface contoured to conform with the at least one terminal flange on at least one other support sector in the plurality of support sectors, each of the first and second ends of each sector further including at least one of a projection and a recess projecting from or into one of the sector and the overlap extension, wherein the respective overlap extensions of adjacent sectors overlap one another and the plurality of connected sectors when connected are configured to form an annular support ring, the overlap extension of the second end includes a hole that extends therethrough in a radial direction and is countersunk on a radially inward side of the overlap extension of the second end, the radial direction corresponding to a direction from the center of the annular support ring to an outer diameter of the annular support ring, the overlap extension of the first end includes a hole that extends in the radial direction, and the hole of the overlap extension of the second end and the hole of the overlap extension of the first end are configured to align with one another to create a path or channel for receiving a fastener configured to secure the support sectors together.

2. A tire support system according to claim 1, wherein each support sector in the plurality of support sectors is arcuate.

3. A tire support system according to claim 1, wherein each sector of the plurality of sectors is connected to an adjacent sector via engagement of a projection on one end of one sector with a recess on one end of another sector.

4. A tire support system according to claim 1, wherein each overlap extension is at least one of an outer and an inner overlap extension, the plurality of sectors including an equal number of outer and inner overlap extensions.

5. A tire support system according to claim 1, wherein one or more projections project from the terminal flange of the overlap extension.

6. A tire support system according to claim 1, wherein the projection and recess are tapered such that they increase in lateral width radially outwardly.

7. A tire support system according to claim 1, wherein each support sector includes at least one recess in each lateral face of the sector.

8. A tire support system according to claim 1, further comprising a fastener extending through each pair of overlapping extensions in a radial direction.

9. A tire support system according to claim 8, wherein the fastener is a nut and bolt.

10. A tire support system according to claim 9, wherein the fastener is positioned in the counter sunken through-hole in the inner overlap extension.

11. A tire support system according to claim 1, wherein the terminal flange on the overlap extension extending from the first end of each sector is distinct from the terminal flange on the overlap extension extending from the second end of each sector.

12. A tire support system according to claim 1, wherein the terminal flange on the overlap extension extending from the first end of each sector is identical with the terminal flange on the overlap extension extending from the second end of each sector.

13. A tire support system according to claim 1, wherein each support sector includes one projection extending and one recess projecting respectively from and into one of the sector and the overlap extension.

14. A tire support system according to claim 1, wherein each support sector includes at least one projection and at least one recess having a profile selected from the group consisting of: a triangular profile, a squared profile, a rectangular, a pentagonal profile, and a semi-circular profile.

15. A tire support system according to claim 1, wherein each sector in the plurality of sectors is identical.

16. A tire support system according to claim 1, wherein each sector in the plurality of sectors is distinct.

17. A tire support system according to claim 1, wherein each sector in the plurality of sectors engages the adjacent sector in a combined radial and lateral engagement.

18. A method, the method comprising:

connecting a plurality of arcuate support sectors into an annular support ring within a pneumatic tire, each support sector having a first end including an overlap extension extending therefrom and a second end including an overlap extension extending therefrom, each overlap extension including a terminal flange and a terminal flange engagement region, the terminal flange engagement region having a surface contoured to correspond with the terminal flange on another support sector, each of the first and second ends of each sector further including at least one of a projection and a recess projecting from or into one of the sector and the overlap extension, each sector of the plurality of sectors connected to an adjacent sector via engagement of a projection on one end of one sector with a recess on one end of another sector, wherein (a) the respective overlap extensions of adjacent sectors overlap one another, (b) the overlap extension of the second end includes a hole that extends therethrough in a radial direction and is countersunk on a radially inward side of the overlap extension of the second end, the radial direction corresponding to a direction from the center of the annular support ring to an outer diameter of the annular support ring, (c) the overlap extension of the first end includes a hole that extends in the radial direction, and (d) the hole of the overlap extension of the second end and the hole of the overlap extension of the first end are configured to align with one another to create a path or channel for receiving a fastener configured to secure the support sectors together;

inserting a first portion of a split wheel having a first outer flange within the annular support; and connecting a second outer flange to the wheel, such that the tire and the annular support are concentrically positioned on the split wheel.

19. A tire support system comprising:

a plurality of arcuate support sectors, each support sector having a first end including an overlap extension extending therefrom and a second end including an overlap extension extending therefrom, at least one overlap extension of each sector including a terminal flange and at least one overlap extension of each sector including a terminal flange engagement region, the terminal flange engagement region having a surface contoured to correspond with the terminal flange on another support sector, each sector of the plurality of sectors connected to an adjacent sector via engagement of the terminal flange on one end of one sector with the terminal flange engagement region on one end of another sector, wherein the respective overlap extensions of adjacent sectors overlap and the plurality of connected sectors form an annular support ring, the overlap extension of the second end includes a hole that extends therethrough in a radial direction and is countersunk on a radially inward side of the overlap extension of the second end, the radial direction corresponding to a direction from the center of the annular support ring to an outer diameter of the annular support ring, the overlap extension of the first end includes a hole that extends in the radial direction, the hole of the overlap extension of the second end and the hole of the overlap extension of the first end are configured to align with one another to create a path or channel for receiving a fastener configured to secure the support sectors together, and each of the first and second ends of each sector further includes at least one of a projection and a recess projecting from or into one of the sector and the overlap extension, each sector of the plurality of sectors connected to an adjacent sector via engagement of a projection on one end of one sector with a recess on one end of another sector.

20. The apparatus of claim 19, whereby, when connected with at least two support sectors of the plurality of support sectors, the first overlap extension of the first support sector is configured to overlap with a respective overlap extension of another support sector of the at least two support sectors, and the second overlap extension of the first support sector is configured to overlap with a respective overlap extension of a separate support sector of the at least two support sectors.

21. An apparatus comprising:
a plurality of arcuate support sectors, comprising:
  a first support sector; and
  a second support sector;
  wherein the first support sector comprises:
    a first end, wherein the first end comprises a first overlap extension extending therefrom, wherein the first overlap extension comprises a first terminal flange and a first terminal flange engagement region; and
    a second end, wherein the second end comprises a second overlap extension extending therefrom, wherein the second overlap extension comprises a second terminal flange and a second terminal flange engagement region;

wherein the first terminal flange engagement region has a first surface contoured to correspond with at least one terminal flange on a second support sector;

wherein the second terminal flange engagement region has a second surface contoured to correspond with at least another terminal flange on the second support sector;

wherein the first end further comprises a projection, wherein the projection projects from the first overlap extension of the first end;

wherein the second end comprises a recess, wherein the recess projects recedes into the second overlap extension of the second end;

wherein the first end of the first support sector is configured to be connected to at least the second support sector via engagement of the projection with a recess on an end of the second support sector; and wherein the second end of the first support sector is configured to be connected to at least the second support sector via engagement of the recess with a projection on another end of the second support sector such that the first support sector and the at least two support sectors form at least part of an annular support ring, wherein the overlap extension of the second end includes a hole that extends therethrough in a radial direction and is countersunk on a radially inward side of the overlap extension of the second end, the radial direction corresponding to a direction from the center of the annular support ring to an outer diameter of the annular support ring, the overlap extension of the first end includes a hole that extends in the radial direction, and the hole of the overlap extension of the second end and the hole of the overlap extension of the first end are configured to align with one another to create a path or channel for receiving a fastener configured to secure the support sectors together.

* * * * *